(12) United States Patent
Browne

(10) Patent No.: US 6,542,157 B1
(45) Date of Patent: Apr. 1, 2003

(54) FONT DECORATION BY AUTOMATIC MESH FITTING

(75) Inventor: Cameron Bolitho Browne, Burleigh Heads (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,698

(22) Filed: Nov. 6, 1998

(30) Foreign Application Priority Data

Nov. 7, 1997 (AU) .............................................. PP0267

(51) Int. Cl.$^7$ .............................................. G06T 11/20
(52) U.S. Cl. .................... 345/441; 345/467; 345/469.1; 345/470; 464/577
(58) Field of Search .......................... 364/577, 469.01; 382/232; 128/661.04; 345/423, 425, 430, 467, 468, 144, 433, 348, 418, 450, 446, 441, 470, 469, 469.1

(56) References Cited

U.S. PATENT DOCUMENTS

| | | | | |
|---|---|---|---|---|
| 4,912,664 A | * | 3/1990 | Weiss et al. ................. | 364/577 |
| 5,231,698 A | * | 7/1993 | Forcier ........................ | 345/446 |
| 5,428,728 A | * | 6/1995 | Lung et al. .................. | 345/450 |
| 5,568,391 A | * | 10/1996 | Mckee .................... | 364/469.01 |
| 5,649,081 A | * | 7/1997 | Nakajima et al. ............ | 345/430 |
| 5,714,987 A | | 2/1998 | Otsuka ........................ | 345/467 |
| 5,734,388 A | | 3/1998 | Ristow et al. ............... | 345/472 |
| 5,754,187 A | | 5/1998 | Ristow et al. ............... | 345/469 |
| 5,936,869 A | * | 8/1999 | Sakaguchi et al. ........... | 345/423 |
| 5,959,632 A | * | 9/1999 | Hashimoto et al. .......... | 345/430 |
| 5,977,977 A | * | 11/1999 | Kajiya et al. ................ | 345/418 |

OTHER PUBLICATIONS

Y.T. Lee et al., Automatic Finite–Element Mesh Generation From Geometric Models—A Point Based Approach, ACM Trans. Graphics, vol. 3, No. 4, 1984, pp. 287–311.
D. Lischinski, Incremental Delaunay Triangulation, Graphics Gems, vol. 3, Academic Press, 1994, pp. 47–59.
G. Bain, Celtic Art, The Methods of Construction, Constable, London, 1951.
A. Sloss, How to Draw Celtic Knotwork: A Practical Handbook, Bland Form, 1955.

* cited by examiner

Primary Examiner—Mark Zimmerman
Assistant Examiner—Kimbinh T. Nguyen
(74) Attorney, Agent, or Firm—Fitzpatrick, Cella, Harper & Scinto

(57) ABSTRACT

A method of creation of artistic effects in object outlines is disclosed including the steps of generating a mesh over the internal area of the outline; forming a series of areas from the mesh; for each of the series of areas, warping one of a predetermined series of tile shapes to cover the area, the tile shapes having a series of edge portions and the one of the series of tile shapes being chosen to substantially match in an aesthetically pleasing sense along its edges with adjacent ones of the tiles. The artistic effects can include Celtic type knot work designs and the object outlines can include font characters. Hence the tiles can include substantially curves representing rope segments and the aesthetically pleasing sense can include substantially matching the position and thickness of rope segments along the edges of the tile. Additionally, the rope segments can include multiple grouped substantially parallel rope segments.

62 Claims, 11 Drawing Sheets

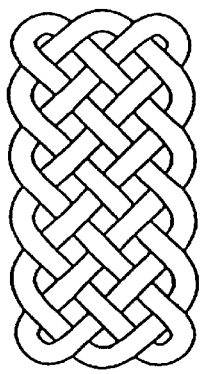 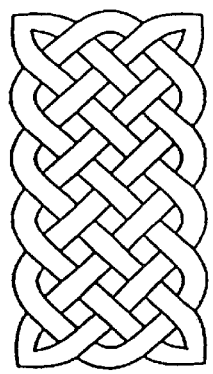 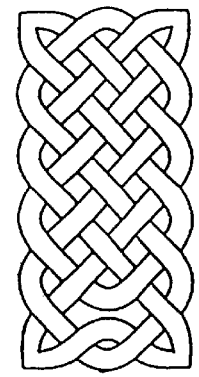 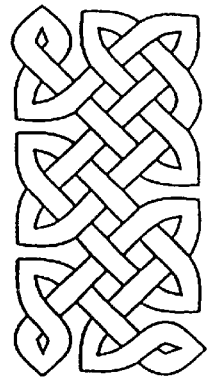
FIG. 1(a)   FIG. 1(b)   FIG. 1(c)   FIG. 1(d)
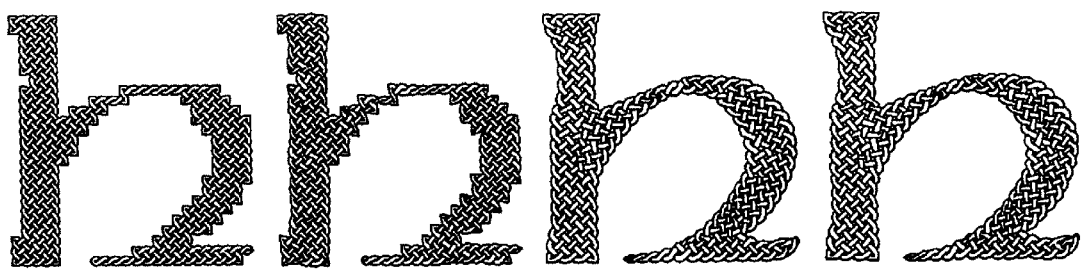
FIG. 2(a)   FIG. 2(b)   FIG. 2(c)   FIG. 2(d)
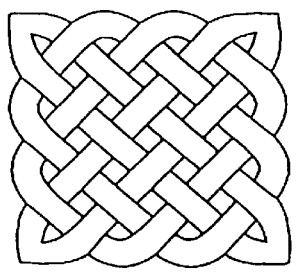 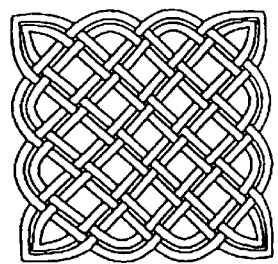 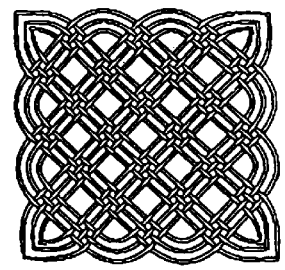
FIG. 3(a)   FIG. 3(b)   FIG. 3(c)

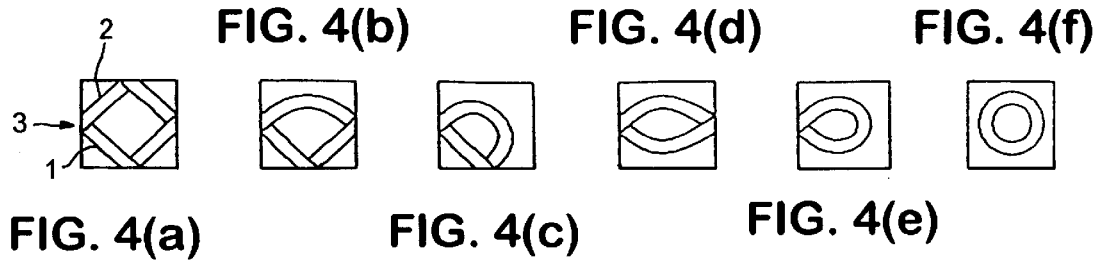
FIG. 4(b)　　FIG. 4(d)　　FIG. 4(f)
FIG. 4(a)　　FIG. 4(c)　　FIG. 4(e)
FIG. 4(g)　FIG. 4(h)　FIG. 4(i)　FIG. 4(j)
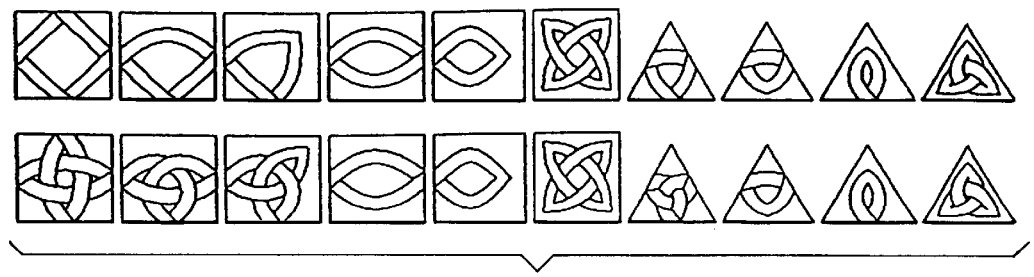
FIG. 5
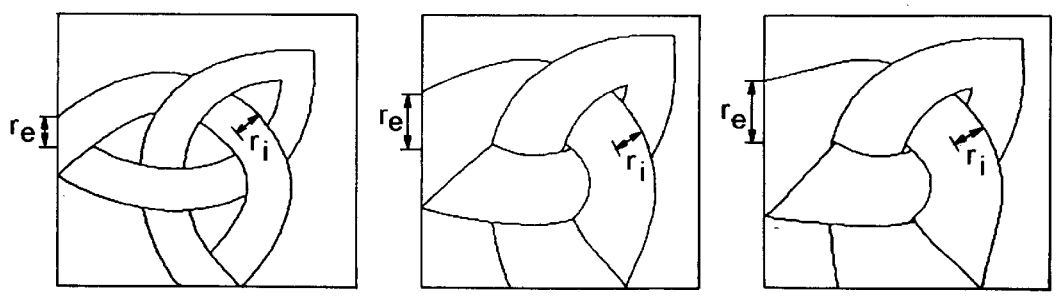
FIG. 7(a)　　FIG. 7(b)　　FIG. 7(c)

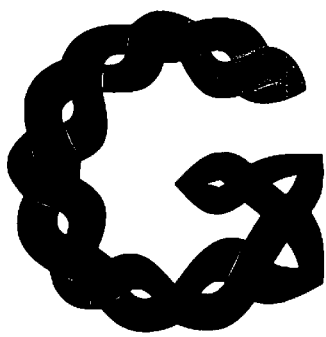 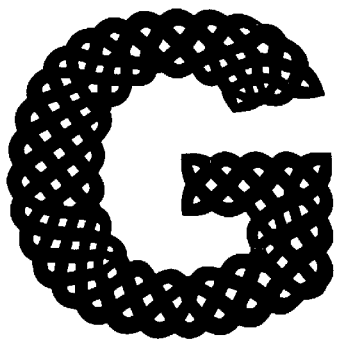 
FIG. 10(a)    FIG. 10(b)    FIG. 10(c)
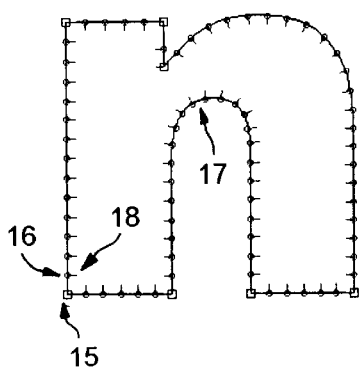 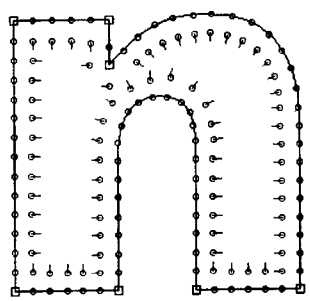 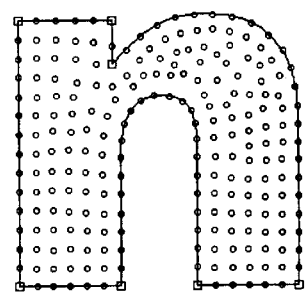
FIG. 11(a)    FIG. 11(b)    FIG. 11(c)

FONT DECORATION BY AUTOMATIC MESH FITTING

FIELD OF THE INVENTION

The present invention relates to the creation of artistic fonts for utilisation by a computer image creation program to create computer generated images.

BACKGROUND OF THE INVENTION

The utilisation of font characters in images is extremely popular and often required. Font characters themselves require substantial artistic judgement in creation. Hence, over time, many thousands of different font types have been created by artists. Each font must be created for each character within an alphabet and in addition, it is popular to create italicised and bold fonts in a matching artistic format. The creation of font characters is therefore an artistically laborious task and this is especially the case where the alphabet contains a large number of characters. Further, non english languages can have a large number of characters, such as chinese characters, arabic and hebrew characters in addition to the roman characters popular with the English language.

Given such a high level of artistic complexity substantial judgements are made by the artist when creating a new font.

One form of popular traditional artwork which appears to have arisen sometime between 563 AD and 744 AD is the "Celtic" style which consists of a woven pair or knotwork. This Celtic knotwork is a distinctive style of art based on the woven plait, often fitted to an outline contour in which cords are broken and rejoined in a systematic manner to create the effect of an intricate weave.

Turning initially to FIG. 1, there is illustrated a number of simple examples of knotwork designs based on a plait. With a first example (a) being based on a plain plait, the example (b) being placed on a plait with angular tips, the example (c) being based on a plait with a break and example (d) being based on a more complicated system of breaks.

For more information on Celtic type fonts, the work of George Bain entitled "Celtic Art; The Methods of Construction", Constable, London, 1951 is normally considered the definitive test on Celtic knotwork constructions techniques.

It should be further noted that many different possible designs techniques are possible wherein substantial artistic judgement can be brought to bare. For example, FIG. 2 illustrates a number of examples (a)–(d) of different artistic renderings of a knotwork creation for the letter "h".

Further, other types of knotwork designs include the alternating weave property of multi-fibres as illustrated in FIG. 3.

Given the high level of artistic endeavour required, it would be desirable to provide for a system for the automatic creation of Celtic type fonts.

In accordance with a first aspect of the present invention, there is provided a method of creating artistic effects in an arbitrary object outline including the steps of generating a series of areas over an internal area of the outline, where the series of areas substantially follow the outline of the object and are substantially regular in size and warping one or more of the selected tile shapes of a predetermined set of tile shapes to cover the corresponding areas of the series, where the selected tile shapes are selected so that the selected warped tile shapes covering the areas of the series have matching patterns along their edges.

In accordance with a second aspect of the present invention, there is provided a method of creating artistic effects in an arbitrary object outline including the steps of: providing a set of tiles in response to user input; generating a series of areas over an internal area of the outline, where the series of areas substantially follow the outline of the object and are substantially regular in size; selecting, for each area, a tile from the tile set, where each tile is selected so as to match selected tiles from the adjacent areas; mapping, for each area, a selected tile to the area so as to cover the area; and rendering the mapped tiles.

In accordance with a third aspect of the present invention, there is provided an apparatus for creating artistic effects in an arbitrary object outline by using a means for generating a series of areas over an internal area of the outline, where the series of areas substantially follow the outline of the object and are substantially regular in size. The apparatus also includes a means for warping one or more selected tile shapes of a predetermined set of tile shapes to cover corresponding areas of the series, where the selected tile shapes are selected so that the selected warped tile shapes covering the areas of the series have patterns matching along their edges.

In accordance with a fourth aspect of the present invention, there is provided an apparatus for creating artistic effects in an arbitrary object outline by using a means: for providing a set of tiles in response to user input; generating a series of areas over an internal area of the outline, where the series of areas substantially follow the outline of the object and are substantially regular in size; selecting, for each area, a tile from the tile set, where each tile is selected so as to match selected tiles from adjacent areas; mapping, for each area, a selected tile to the area so as to cover the area; and rendering the mapped lines.

In accordance with a fifth aspect of the present invention, there is provided a computer program product including a computer readable medium having recorded thereon a computer program for creating artistic effects in an arbitrary object outline, the computer program product including means for generating a series of areas over an internal area of the outline, where the series of areas substantially follow the outline of the object and are substantially regular in size and a means for warping one or more selected tile shapes of a predetermined set of tile shapes to cover the corresponding areas of the series, where the selected tile shapes are selected so that the selected warped tile shapes covering the areas of the series have patterns matching along their edges.

In accordance with a sixth aspect of the present invention, there is provided a computer program product including a computer readable medium having recorded thereon a computer program for creating artistic effects in an arbitrary object outline, the computer program product including a means for: providing a set of tiles in response to user input; generating a series of areas over an internal area of the outline, where the series of areas substantially follow the outline of the object and are substantially regular in size; selecting, for each area, a tile from tile set, where each tile is selected so as to match selected tiles from adjacent areas; mapping, for each area, a selected tile to the area so as to cover the area; and rendering the mapped tiles.

Preferably, the artistic effects include Celtic type knotwork designs and the arbitrary object outlines include font characters. Hence, the tiles can include substantial curves representing rope segments and the selecting and warping can include substantially matching the position and thickness of rope segments along the edges of the tile.

Additionally, the rope segments can include multiple grouped substantially parallel rope segments.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 1(a)–(d) illustrates a number of example knotworks;

FIG. 2 illustrates an example Celtic knotwork design for the letter "h";

FIGS. 3(a)–(c) illustrates the various variations of knotwork designs;

FIGS. 4 and 5 illustrate different possible tiling arrangements for utilisation and construction of knotwork designs;

FIG. 7 illustrates the process of variation of thickness of knotwork designs;

FIGS. 10(a)–(c) illustrate the effects of variation in a density parameter on the knotwork structure;

FIGS. 11(a)–(c) illustrates the process of mesh formation utilising the preferred embodiment;

DESCRIPTION OF PREFERRED AND OTHER EMBODIMENTS

In the preferred embodiment, there is provided methods for automatically fitting a flexible mesh to an arbitrary character outline, based on a semi regular distribution of internal points and their Delaunay triangulation. The mesh is processed to be composed of substantially well formed quadelectral elements, with additional supporting triangular elements, upon which a knotwork design is then realised.

Generally, any method of knotwork design generally demonstrates the following desirable features:

Grid agreement: Cord paths are strongly diagonal, reflecting their derivation from the plaitwork grid.

Continuity: Designs are composed of a single cord (or as few as possible) that follows a continuous path. The complexity that can be achieved with a single cord is a measure of the artist's skill.

Alternating weave: Starting from an arbitrary point, a cord alternately passes over and under the intersecting cord at each crossing, as it is followed around the design. It is known that an alternating weave can be applied to any set of closed curves if there exists: (i) no point at which three or more curves cross, and (ii) no point at which curves touch without then crossing.

Regularity: Cords are evenly spaced and uniformly dense across the pattern. Breaks are generally placed symmetrically and at regular intervals.

Repetition: Knotwork units often form motifs that are repeated across the design, and connected continuously with neighbouring units. To fit the outline shape, motif units may vary in size uniformly, or through (possibly non-affine) transformations.

Cord interlacement: The term interlacement refers to the technique of replacing single cord paths with multiple parallel cord paths. Interlaced cords are topologically equivalent to their single-cord counterparts, and obey the alternating weave constraint. N-interlacement refers to the replacement of single cord paths with n cords.

Preferred Embodiment of Method(s)

Figure 21:
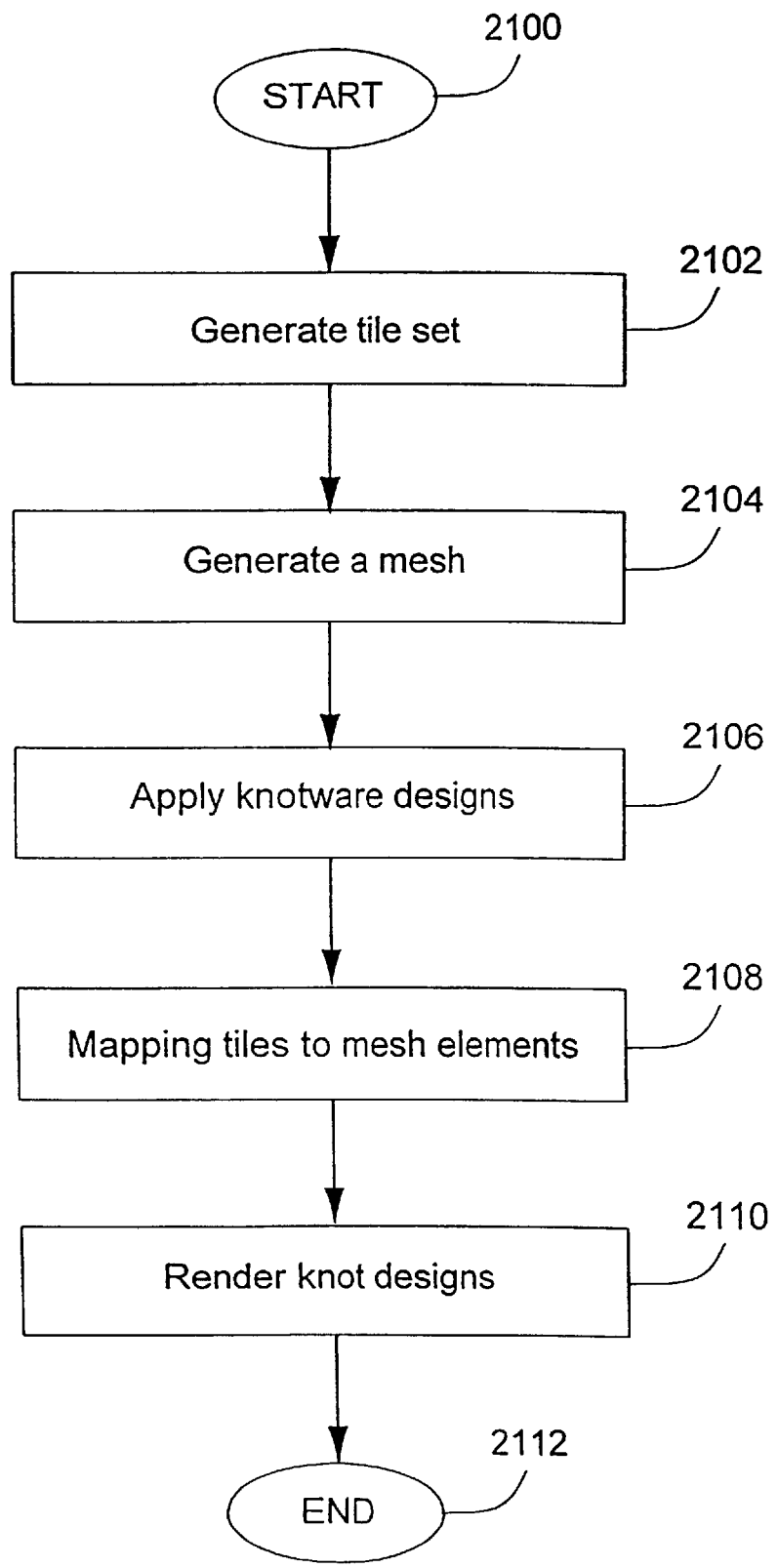
FIG. 21 is a flow diagram of a method of creating artistic effects in object outlines in accordance with a preferred embodiment.

Turning now to FIG. 21, there is shown a flow diagram of the preferred method of creating artistic effects in object outlines. In step 2100, the method commences and any necessary parameters are initialised. In the next step 2102, a tile set is generated in response to user input. The manner in which the tile sets are generated is discussed in more detail below under the heading "1. Generation of Tile Sets". After the completion of the generation of the tile sets, the method proceeds with step 2104, where a mesh is generated. The manner in which this mesh is generated is described in more detail below under the heading of "2. Generation of Mesh". In the next step 2106, knotwork designs are applied to the mesh. This step is described in more detail below under the heading "3. Applying Knotwork Designs to the Mesh". After step 2106, the method proceeds to step 2108, where the tiles are mapped to mesh elements of the mesh. This step is described in more detail below under the head "4. Mapping Tiles to Mesh Elements". In the next step 2110, the created knotwork fonts are stored and then rendered. The manner in which the fonts are rendered are described in detail in the section herein entitled "5. Rendering Knotwork Fonts". The method then terminates at step 2112.

1. Generation of Tile Sets

A variety of alternative techniques are known for the realisation of knotwork designs, including the use of discrete tile sets. Sloss (A, Sloss, "How to Draw Celtic Knotwork: A Practical Handbook", Blandford, London, 1995) demonstrates this approach by applying tiles directly to a simple regular (square) 4-mesh, with rotation as required. The results being similar to that set out in example (a) of FIG. 2. To successfully apply this technique to a non-regular 3,4-mesh, however, the tile set must be expanded to include triangular tiles that 'fit' with arbitrarily shaped quadrilateral tiles (derived from non-affine transformations applied to square tiles). An n-tile set is complete if it contains a tile for each possible entry/exit combination, for n edges. FIG. 4 shows a minimal complete 3,4-tile set that can handle all cases that may occur in a 3,4-mesh.

The standard right-handed weave is the convention used in this description, therefore entry curves form overpasses at tile edges, and exit curves form underpasses at tile edges. For example, as illustrated in FIG. 4, the tile (a) includes exit curve 1 forming an underpass at edge 3 with an entry curve 2. The curves illustrated in FIG. 3 show the paired offsets (positive and negative) that are derived from director curves describing the cord paths (which are not shown).

Each tile contains at most one entry curve and one exit curve per edge, and edges with entry curves always have a corresponding exit curve. Entry and exit curves are open curves. Internal curves are closed curves that exist within the tile boundary without touching or crossing it at any point and are illustrated for example, in FIGS. 4(f) and 4(j).

To maintain geometric continuity between neighbouring tiles, angles or entry and exit should agree (45° in this case), and the relative entry and exit positions should also agree (0.5 for both unit triangle and unit square tiles).

FIG. 5 demonstrates a more complex complete 3,4-tile set. Any number of tiles from different tile sets may be combined to create interesting weaving effects, provided that the resulting set is complete with respect to the target mesh. Complete 3-tiles sets or complete 4-tile sets (subsets of the complete 3,4-tile sets) may be further chosen to fit a 3-mesh or 4-mesh respectively.

1.1 Multiple Cord Interlacement

The alternating weave property of closed lane curves can be exploited to automatically apply n-interlacement to tile sets to produce effects such as those illustrated in FIG. 3(a) and FIG. 3(c). Cord paths describing the n-interlacement are obtained by offsetting the director (entry) curves to a specified cord spacing. The defining cord edges can then be obtained by offsetting the n cord paths to a specified cord width in the positive and negative directions, relative to the cord paths.

Figure 6:
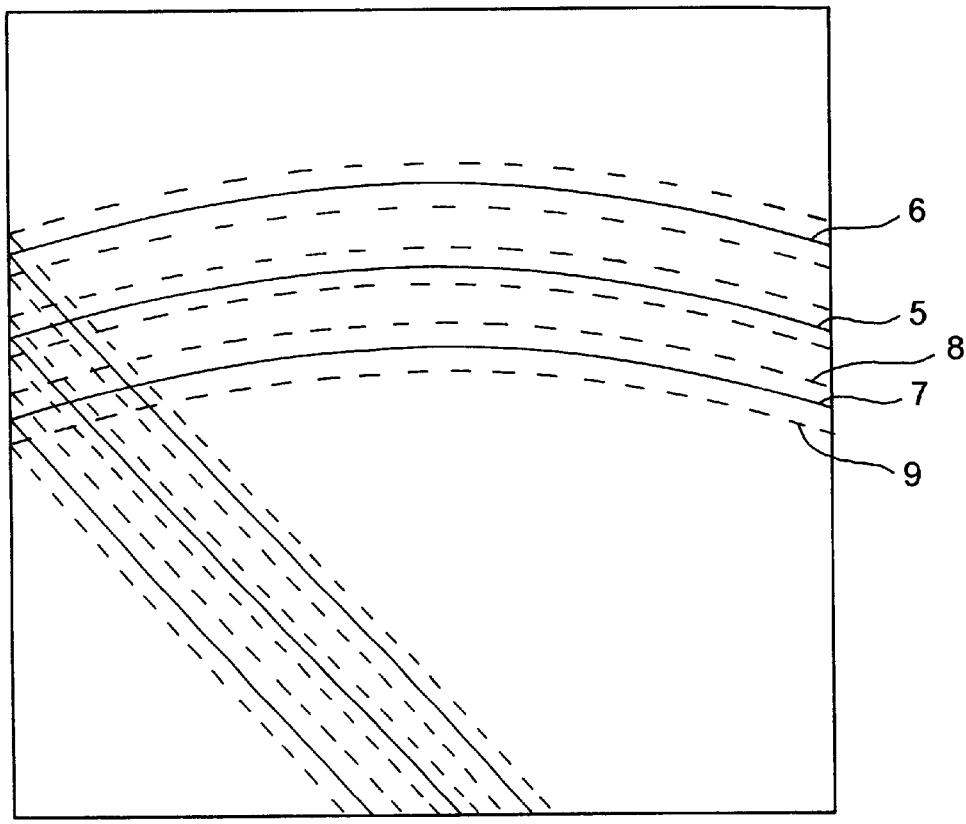
FIG. 6 illustrates the process of dealing with knot overlays in accordance with the preferred embodiment.

Turning now to FIG. 6, there will be now illustrated an example of the process of multicord interlacement. A single director cord path 5 is first offset in both directions 6, 7. The cord edges eg. 8, 9 are then obtained by offsetting the cord path eg. 7 by a specified cord width in both directions 8, 9.

Both the director and cord path offsets are exact to within a given tolerance, but must be processed to ensure geometric continuity matching that of the original curves. Offset curve ends can be clipped or extended to snap end points as required, then clipped to the unit tile shape. Entry and exit points are adjusted to maintain constant spacing at tile edges.

The alternating weave pattern is visualised by hiding curve segments that correspond to underpasses. This can be achieved by subdividing curves at intersection points, and marking every fourth crossing interval as 'hidden'. Care must be taken to synchronise the crossing count for multiply interlaced curves.

As the positive and negative cord path offsets must match at over and under passes, invalid weaving patterns may occur for convoluted director curves or multiple interlacement, especially for wider cords. This problem is avoided through the use of adaptive variable offsetting of the edges as follows:

apply constant offset
    while invalid weave
        reduce internal offset radius
        apply variable offset The offset radius at curve entry and exit points remains constant, despite the internal offset radius, to ensure that curve ends correspond to those of neighbouring tiles. A simple heuristic is used to determine whether a weaving pattern is valid, based on the number of crossings for each cord offset.

FIG. 7 demonstrates the adaptive variable offsetting process for increasing cord width, where $r_a$ is the constant offset radius at entry/exit points, and $r_f$ is the variable radius offset at all other (internal) points. Note how the curve width at midpoints is effectively reduced to allow a valid weave, and larger $r_e$:$r_i$ ratios (such as that of FIG. 6c) require that the 45° entry/exit angle condition be relaxed for offsets, though the equispaced entry/exit position condition holds. The offset radii are given in tile units, where each tile edge is 1.0 unit in length with the files being as follows: (a) constant offset $r_c \equiv r_i = 0.075$, (b) variable offset $r_e = 0.15$, $r_f = 0.1275$, (c) variable offset $r_c = 0.175$, $r_i = 0.1264$.

Hence the generation of n-interlaced tile sets can be parameterised, and a wide variety of patterns may be created simply by specifying: (i) a set of director curves, (ii) the number of interlaced cords offsets, (iii) cord separation, and (iv) cord width. The tile set used to generate the knotwork design has then been defined. Rather than generate such tile sets each time, the tile sets may be stored in a library from which they may be accessed by a user during the creation process. The next step is to generate the fitted 3,4-mesh upon which the tile set is to be mapped.

2. Generation of a Mesh

For an explanation of mesh generation algorithms, reference is made Y. T. Lee and A. De Pennington, "Automatic Finite-Element Mesh Generation from Geometric Models—A Point-Based Approach", ACM Transactions or Graphics, Vol. 3, No. 4, Oct. 1984. Known algorithms for the generation of a finite-element mesh composed of quadrilateral and triangular elements normally are constructed from simple shapes with regularly distributed point sets that are merged using constructive solid geometry (CSG) rules. This approach is generally unsuitable here for two main reasons:

Shape complexity: Character outline shapes may be arbitrarily complex, and may not amenable to regular point distributions. A method for generating an acceptable distribution of mesh points is central to the following algorithm.

Directional bias: One of the strengths of the methods referred to in the aforementioned article is the efficient columnar traversal of mesh points. However, this introduces a strong left-right bias that is especially noticeable for irregular point distributions. For knotwork designs it is desirable that mesh elements be strongly fitted to the outline, and that any uncertainty occurs towards the centre of the shape. This is especially important for the generation of borders around knotwork shapes such as in the example shown in FIG. 8.

Figure 9:
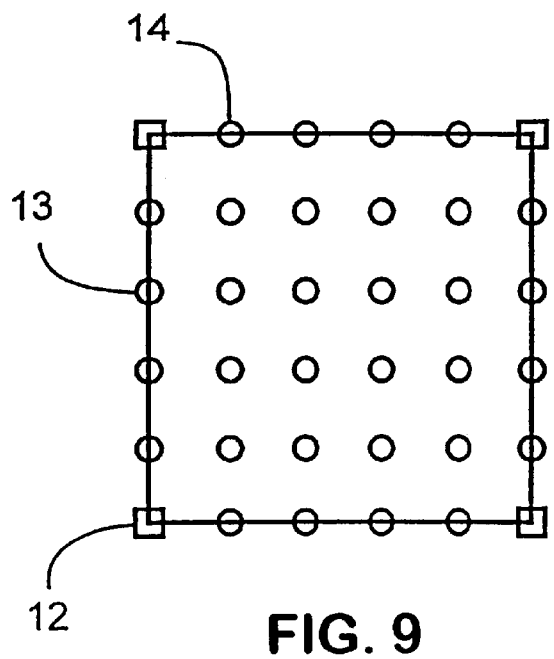
FIG. 9 illustrates a simple mesh structure utilising the preferred embodiments.

Turning to FIG. 9 where there is illustrated a sample mesh grid, the following notation will be used in the discussion of the preferred embodiment:

v-point(eg. 12)=a mesh point at an outline vertex,
    e-point (eg. 13)=a mesh point on the outline that is not a vertex (ie. an edge point),
    b-point=boundary point (either an e-point or a v-point),
    i-point (eg. 14)=mesh point internal to the outline shape.

The generation of a distribution of mesh points within a font outline shape is achieved using a wavefront that moves in discrete steps. The front progresses from the outline towards the shape's interior, until it is cancelled by an opposing wavefront, depositing equispaced points along its perimeter at regular intervals. The density of the mesh is determined by a density parameter. A base length ($L_b$) is determined directly from the mesh density, which is the preferred length of mesh element edges and the default spacing for mesh points. $L_b$ is inversely proportional to the density parameter FIGS. 10a to 10c illustrate the effect of variation in the density parameter with FIG. 10(a) having a density of 0.1, FIG. 10b a density of 0.5 and FIG. 10c a density of 0.825.

The minimum length ($L_m$) for element edges is given by $L_m = L_b/\sqrt{2}$. This puts a lower limit on mesh element size, ensuring some degree of regularity, and means that any mesh point P falling within the region described by a set of 3 or 4 reasonably spaced ($L_b$ distant) mesh points $P_r$ will be at most $L_m$ distance from at least one member of $P_r$. This is critical in detecting interference along the wavefront and ensuring that the wavefront progression terminates.

In FIGS. 11a to 11c there is illustrated an example of the mesh generation process.

As shown in FIG. 11a the wavefront is initialised by the addition of v-points eg. 15 that correspond to outline curve end points that do not exhibit first-degree geometric continuity across the join. Intervals along the outline between successive v-points are seeded by e-points eg. 16 that are initially regularly spaced by a distance as close to $L_b$ as possible. This regular spacing is modified by local outline curvature so that convex intervals are more densely packed and concave intervals are more sparsely spaced (see the arch 17 of the 'n' in FIG. 11a). This curvature-dependent spacing reflects the effect on point spacing observed when a regular mesh is subjected to torsion. The seeded e-points are also added to the initial wavefront (FIG. 8a).

Figure 12:
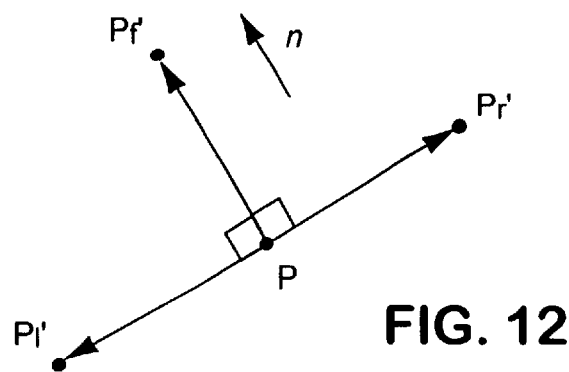
FIG. 12 illustrates the process of deriving points from a given point utilised by the mesh generation programme of the preferred embodiment.

A normal direction vector n, eg. 18 is associated with each initial seed point, determined by the inward curve normal at the corresponding point on the outline. The seed b-points that include the initial wavefront are also added to the initial set of mesh points $P_m$. The wavefront progressively moves forward, adding new points to $P_m$ until $P_w$ is empty in accordance with the following method:

$P_m = P_w$ = initial seed points
while $P_w$ not empty
  for each $P \in P_w$
    generate $P_p'$
    merge $P_p'$ with $P_m$
    add surviving $P_p'$ to $P_w$
    remove P from $P_w$ where $P_p'$ is the projected point set derived from point P. As illustrated in FIG. 12 $P_p'$ includes three points: (i) the forward projected point ($P_f'$) in the direction n, (ii) the left projected point ($P_l'$) in the direction 90° anticlockwise from n, and (iii) the right projected point ($P_r'$) in the direction 90° clockwise from n. All three projected points are a distance $L_b$ from P. Projected points that lie outside the outline shape are removed from $P_p'$.

Each member of $P_p'$ is tested for proximity to existing $P_w$ points, and point pairs that are less than $L_m$ distance apart are merged according to rules given in the following table wherein, given two points to be merged ($P_1$ and $P_2$), the actions outlined are as follows:

|  | $P_2$ is v-point | $P_2$ is e-point | $P_2$ is i-point |
|---|---|---|---|
| $P_1$ is v-point | Delete either | Delete $P_2$ | Delete $P_2$ |
| $P_1$ is e-point | Delete $P_1$ | Delete either | Delete $P_2$ |
| $P_1$ is i-point | Delete $P_1$ | Delete $P_1$ | Take average |

Taking the average of two i-points involves moving either of the points to the midpoint of the line segment $P_1 P_2$ and deleting the other point. As this midpoint may itself violate the $L_m$ space of existing $P_m$ points, a postprocessing step merges invalid pairs within $P_m$. Point pair proximity can be efficiently determined by a grid-based local neighbourhood search.

All points generated during the wavefront progression are i-points, so only the last row and last column of the table apply during this process. However, other cases may occur when generating the seed points with which the wavefront is initialised, for instance adjacent v-points that are less than $L_m$ distance apart.

The wavefront is propagated to each successive step by the addition of $P_p'$ members that are not deleted during the merge operation (For example, see FIG. 11b). Each mesh point is given a timestamp that indicates at which wavefront iteration it was added to $P_m$. All members of $P_p'$ are merged when opposing wave fronts meet, effectively cancelling out the wavefront at those points giving a final mesh grid as illustrated in FIG. 11c. The relationship of length $L_m$ to $L_b$ previously mentioned ensures that wavefronts do not 'pass through' each other. The wavefront may split into separate pockets during its progression, in which case the set $P_w$ is the union of member points of each pocket. Following wavefront cancellation, we have the complete set of mesh points $P_m$.

The final distribution of points is quite regular around the outline as desired, but becomes more uncertain towards the shape's centre (noticeable in the arch of the 'n' 19 FIG. 11c). Internal regularity is improved during the following steps of mesh element generation.

A Delaunay triangulation (DT) process is then applied to the set of mesh points generated in the previous step. The Delaunay triangulation process is a well known process for the generation of high quality meshes. For a further discussion of the process, reference is made to Dani Lischinski, "Incremented Delaunay Triangulation", Graphics Gems, Vol 3, No. 4, Academic Press, Boston, 1994 at pages 47–59.

Figure 13A:
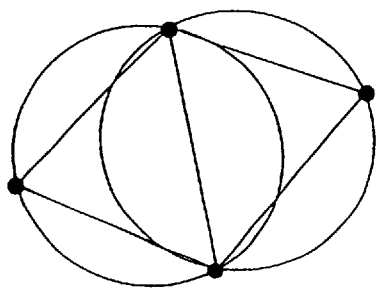
FIGS. 13(a)–(c) illustrate a number of Delaunay triangles.
Figure 13B:
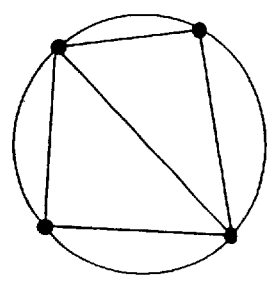
Figure 13C:
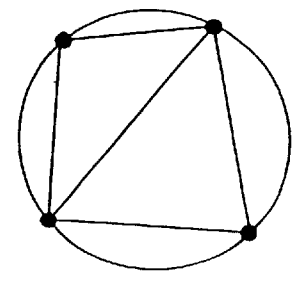

The Delaunay triangulation of a finite set of data points is the triangulation that satisfies the empty circumcircle property, that is, there exists no triangle within the DT whose circumcircle contains any data points FIGS. 13a to 13c illustrate example Delaunay triangles. It is a robust and well-documented technique for which efficient algorithms exists.

The algorithm can be summarised as follows: starting with an initial triangle known to contain all mesh points, each mesh point is added to the DT such that the empty circumcircle property holds. As each point is added to the DT new edges must be created to accommodate it, and existing may need to be 'flipped' between alternative point pairs to maintain the empty circumcircle property. Flipped edges may themselves require further edges to be flipped, though this process converges quickly in practice.

A drawback of Lischinski's algorithm is that four or more cocircular points results in a non-unique DT as illustrated in FIGS. 13b and 13c. However, this problem is largely irrelevant to the process of 3,4-mesh generation as such degenerate cases are readily converted to equivalent quadrilateral mesh elements (for the case of four coincident points anyway). That is, the triangles FIGS. 13a and 13b will resolve to the same quadrilateral element.

2.1 Conversion to Mesh Elements

The final step in the generation of the 3,4-mesh is the conversion of DT triangles into quadrilateral and triangular mesh elements. This process can proceed as follows:

Internal triangles (DT triangles whose midpoint lies within the outline shape) are identified and added to the set $T_i$. Non-internal triangles are discarded, including those triangles formed from the initial three DT seed points. Degenerate internal triangles (those with area less than some threshold) are also discarded. Each internal triangle is given a timestamp that corresponds to the minimum timestamp of the mesh points that include its vertices.

Figure 14A:
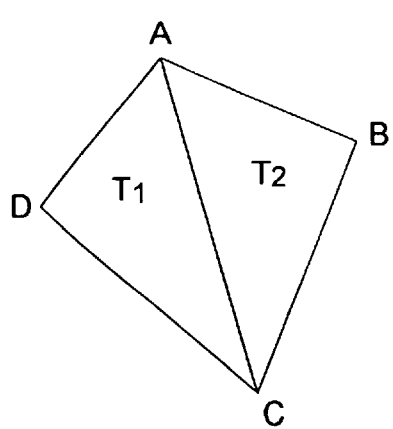
FIGS. 14(a)–(b) illustrate the process of forming quadrilaterals from triangles as utilised in the preferred embodiment.

Optimal quadlateral elements that can be formed front the members of $T_1$ are identified and added to the 3,4-mesh. An optimal quadrilateral occurs when the edge shared by two neighbouring triangles is the longest edge of each triangle, and is instantiated by the removal of the shared edge. For example, in FIG. 14a the optimal quadrilateral ABCD is obtained by removing edge AD common to triangles $T_1$ and $T_2$. The two component triangles $T_1$, $T_2$ are removed from $T_1$. To encourage an outward-in progression of optimal quadrilateral elements is discrete steps, an initial pass is made on $T_i$ members with the same timestamp, and then another pass is made regardless of timestamp.

Figure 14B:
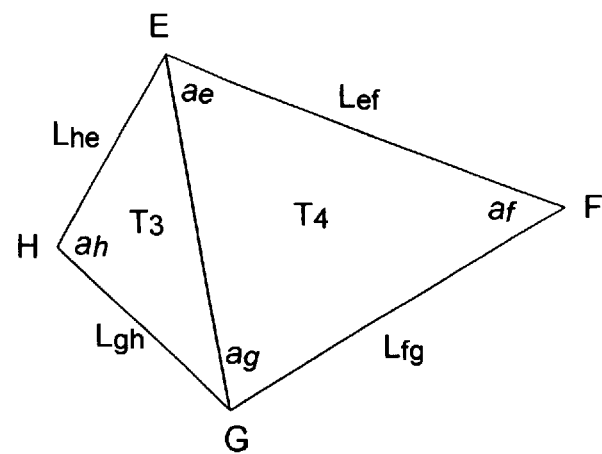

Good quadrilateral elements that can be formed from the remaining members of T; are identified and added to the 3,4-mesh. A good quadrilateral occurs when the shared edge of neighbouring triangles is removed, and the resulting quadrilateral satisfies some conditions regarding shape and proportion. Turning now to FIG. 14b, a suitable 11b, evaluation function used for the triangles $T_3$ and $T_4$ in the current implementation is as follows:

if $[(\Sigma|\alpha_i-90|)/90+(\Sigma|L_i-L_{avg}|)/L_{avg}]$<threshold then quadrilateral is good
where $\alpha_i$ is the quadrilateral's internal angle at the $i^{th}$ vertex, $L_i$ is the length of the $i^{th}$ edge (for i=1 to 4), and $L_{avg}$ is the average edge length. This favours quadrilateral elements with internal angles that are approximately right-angled, and edges of approximately equal length.

The two component triangles used to create the good quadrilateral are removed from Ti. Again, an initial pass is made on $T_i$ members with the same timestamp, and then another pass is made regardless of timestamp.

A quadrilateral is well-formed if it is optimal or good.

Figure 15:
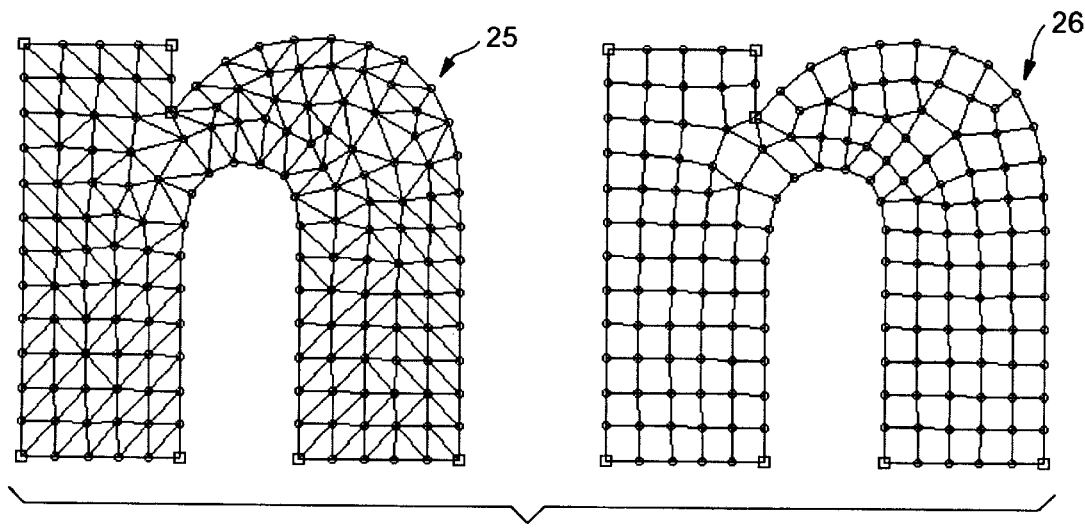
FIG. 15 illustrates an initial and final mesh for an example of the preferred embodiment.

The remaining members of $T_i$ are added to the 3,4-mesh directly as triangular mesh elements. The 3,4-mesh is now constructed; with all members of $T_i$ being either converted into well-formed quadrilateral mesh elements, or added directly. FIG. 15 illustrates and example mesh fitting process wherein the mesh 25 is translated into the corresponding final mesh 26.

the uniformity of mesh elements can be improved at this point by adjusting each mesh point so that it is as equidistant as possible from all other mesh points with which it shares a mesh element edge. This is evident in the improvement in regularity from the mesh 25 to the mesh 26. The parameter can be specified for the number of adjustment passes to be applied through a uniformity parameter, in practice no more than a couple of passes are required.

By contrast, mesh points may be perturbed by moving each mesh point a small amount in a random direction. This introduces entropy into the mesh and reduces the regularity evident in some automatically derived grids. A user specifies a perturbation value to achieve this effect FIG. 2b and FIG. 2d illustrate final examples where a mesh perturbation has been applied.

Figure 16:
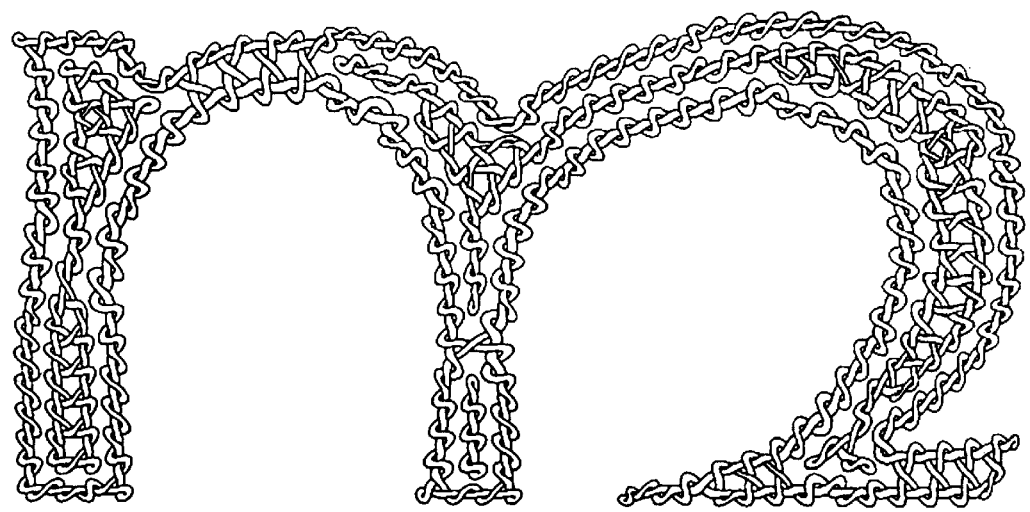
FIG. 16 illustrates one form of resulting character divided by the preferred embodiment.

The 3-mesh for an arbitrary outline shape can be derived directly from the DT by following the above method, but avoiding the quadrilateral conversion steps. FIG. 16 illustrates a character formed from 3-mesh to which a triangular tile set has been applied.

The 4-mesh for an arbitrary outline shape cannot be derived from the DT using the above method, as $T_i$ members remaining after the conversion to quadrilateral elements cannot be discarded without serious impact on the connectivity of the resulting mesh. Instead, the 4-mesh can be obtained by sampling the filled outline shape on a regular grid, and converting each occupied grid cell directly to a quadrilateral mesh element which is for exampled illustrated in the examples FIG. 1a and FIG. 1b. This is analogous to pixelating the filled outline shape at a lower resolution. The grid resolution is governed by the density parameter.

Preferably the user may choose the mesh type explicitly through a dialogue, or implicitly through their choice of tile set.

3. Applying Knotwork Designs to the Mesh

Figure 8:
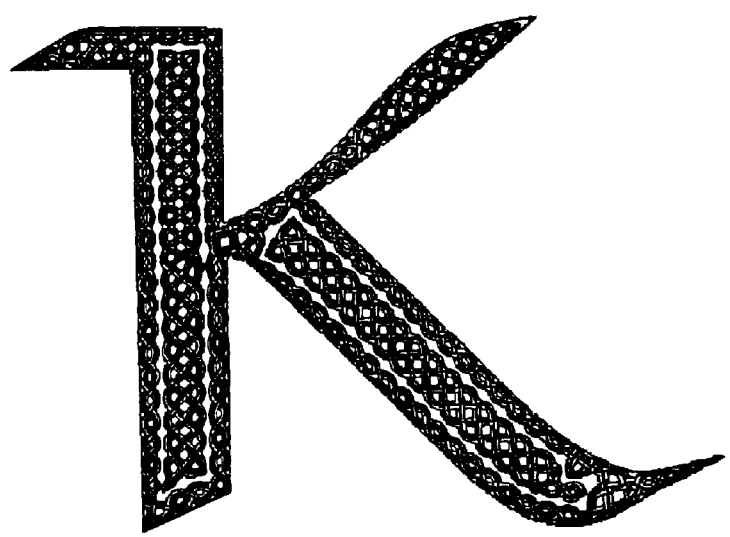
FIG. 8 illustrates a character having a boarder portion and an internal portion.
Figure 17:
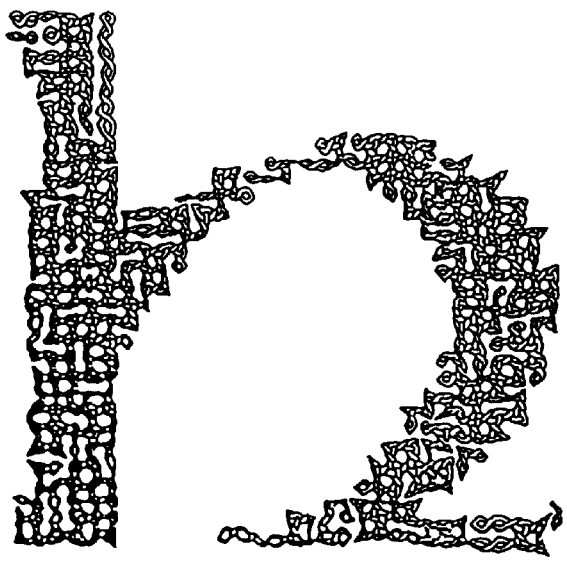
FIG. 17 illustrates a character structure as created in accordance with the variation of preferred embodiments.

Given a 3,4-mesh fitted to the outline shape, mesh elements are related so that neighbouring elements share a link across the common edge. This allows knotwork continuity across tile edges. Breaks are introduced into the design by severing the link between neighbouring elements FIGS. 17 and 8 illustrate examples of breaks with FIG. 17 having random breaks across the shape on a square grid with perturbation=0.4, and FIG. 8 being 3,4-mesh with border width=1.

Dividing the knotwork into border and interior regions, a device common in Celtic knotwork, is readily achieved by introducing breaks between elements with timestamp less than or equal to the border width and those with timestamp greater than the border width. As illustrated by the example of FIG. 8 and FIG. 16. Border width can be a parameter set by the user.

Once the knotwork design has been decided and applied, a knotwork tile and its orientation is associated with each mesh element. For each mesh element E, the set of matching tiles $T_m$ is determined, such that each tile $T \epsilon T_m$ has the same number of vertices as E, and the number and distribution of entry/exit curve pairs in T matches the number and distribution of unbroken links in E. A tile $T \epsilon T_m$ is chosen at random, and the orientation required to match T to E is recorded.

4. Mapping Tiles to Mesh Elements

The paths that describe the final knotwork are derived as follows: copies are made of the component curves of each mesh element's associated tile. These tile curve copies are then mapped to fit the element's position, orientation and shape. Only the control points that describe the curves are mapped.

For quadrilateral mesh elements, the unit square tile curves are mapped using a standard non-affine bilinear warp. The source coordinates are the vertices of the tile's unit square, and the destination coordinates are the mesh element vertices. The associated orientation value is used to align source and destination coordinates correctly.

4.1 Triangular Interpolation

Figure 18:
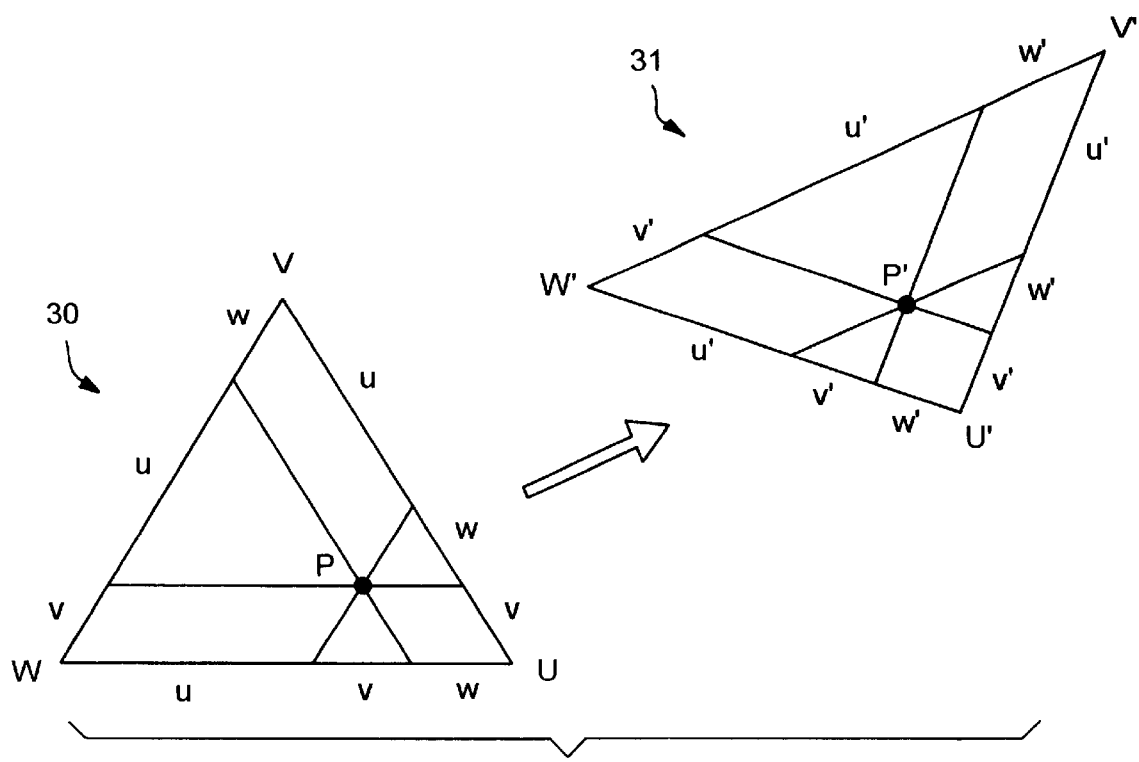
FIG. 18 illustrates the process of triangular warp mapping as utilised by the preferred embodiment.

Triangular tiles are mapped to triangular mesh elements using an interpolation scheme based on barycentric coordinates. An example of this process is illustrated in FIG. 18 wherein there is shown the warp of a first triangle 30 to a second triangle 31. Each control point P of the unit tile triangle UVW is mapped to the corresponding point P' in the destination triangle U'V'W'.

The barycentric coordinates u, v, w for source triangle UVW, and u', v',w'for destination triangle U'V'W', are subject to the constraints that u+v+w=1 and u'+v'+w'=1. These coordinates can be evaluated as follows:

$$u = A_u/A \qquad v = A_v/A \qquad w = A_w/A$$
$$u' = A'_u/A' \qquad v' = A'_v/A' \qquad w' = A'_w/A'$$

where A is the area of the triangle UVW, $A_u$ is the area of the triangle PVW, $A_v$ is the area of the triangle PWU, $A_w$ is the area of the triangle PUV, similarly for the destination areas A', $A_u'$, $A_v'$ and $A_w'$. The area of triangle UVW is given by:

$$A = \tfrac{1}{2}[(V_x-U_x)(W_y-U_y)-(W_x-U_x)(V_y-U_y)]$$

for vertices in anticlockwise order. This result will be negative for clockwise triangles.

Advantage can be taken of the fact that the barycentric coordinates for point P remain constant under transformation from triangle UVW to point P' i triangle U'V'W' as follows:

$$u = u'$$
$$A_u/A = A'_u/A'$$
$$A'_u = A_u A'/A$$

Substituting the area equation for $A_u'$ and rearranging, this expands to:

$$P_x'(V_y'-W_y')+P_y'(W_x'-V_x')=2\,A_u A'/A - V_x'W_y'+W_x'V_y'$$

Similarly for v=v':

$$P_x'(W_y'-U_y')+P_y'(U_x'-W_x')=2\,A_v A'/A - W_x'U_y'+U_x'W_y'$$

This gives a system of two linear equations with two unknowns ($P_x'$ and $P_y'$) which are solved to determine P'.

After the tile set has been mapped to the mesh, the only step remaining is to render the final result.

5. Rendering Knotwork Fonts

Figure 19:
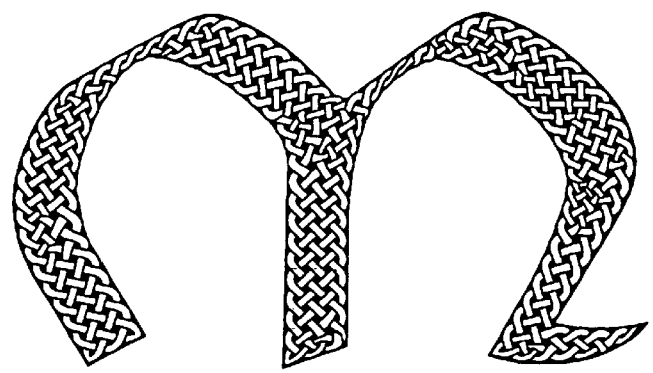
FIG. 19 illustrates a first effect created for a Celtic font.

Each set of knotwork curves generated by the 3,4-mesh tiling can be stored in a single edges record per cord for each character. Each edges record can be associated with a path. Each such path is readily composited with other graphical objects such as a filled character shape as illustrated in FIG. 19 or another set of knotwork curves generated at a different mesh density to create more complex effects.

There are three basic rendering styles of interest:

Stroked edges: visible curve segments are drawn as open curves using a stroked pen.

Edge blends: Visible curve segments are paired with their opposing offsets (that is, positive cord offsets are paired with their negative counterparts), and are drawn as open curves with an edge blend between them.

Filled shapes: Visible curve segments and their opposing offsets are closed and filled.

Highlighting and shadow effects provide visual cues that emphasise the weave pattern. One passable depth effect can be achieved by compositing an edge-blended path that smoothly changes from fully opaque along its centre to fully transparent along its periphery, over a filled path in a darker colour that exactly matches its shape. The result can then composited over a filled background shape. The same edges record is used for all paths that make up the knotwork in this example, increasing efficiency.

Figure 20A:
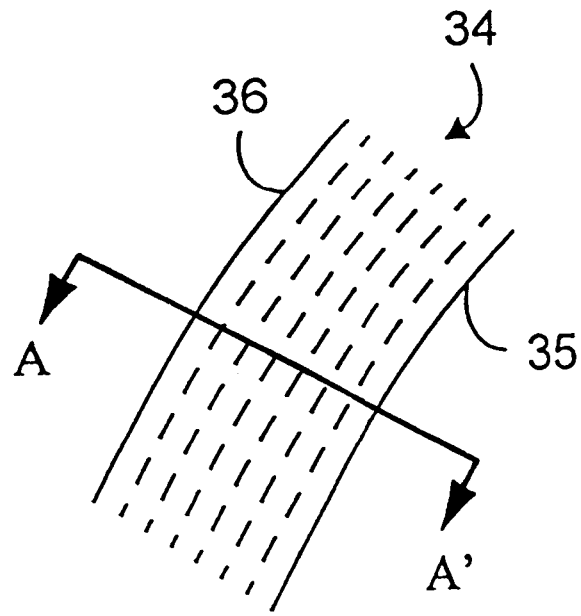
FIGS. 20(a)–(b) illustrate a second effect utilising the creation of Celtic fonts.
Figure 20B:
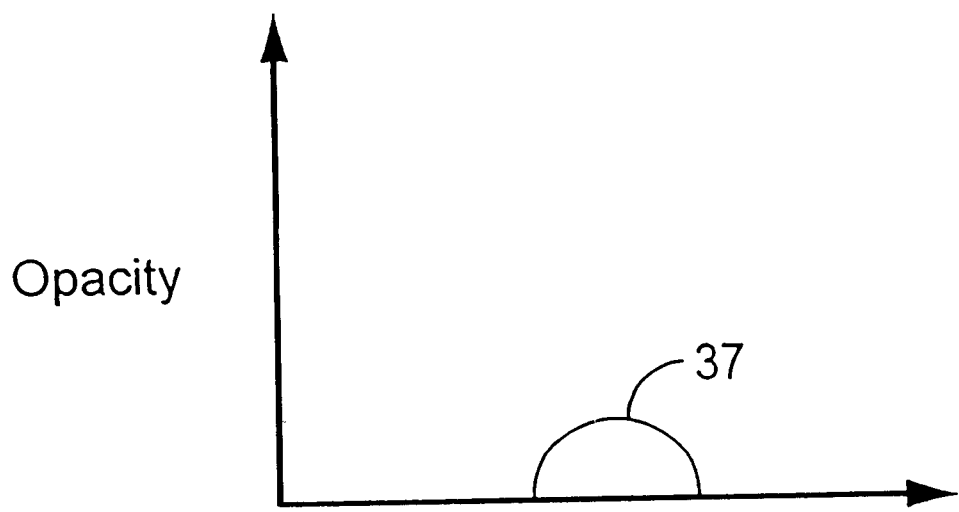

For example, in FIG. 20a, there is illustrated a portion of a rope 34 having edges 35, 36. An opacity section taken through the line A—A—of FIG. 10a is illustrated in FIG. 20b wherein the opacity profile is as illustrated 37.

It will be further evident that many other variations can be achieved so as to provide for a wide range of character not work designs.

The method has been described for fitting a flexible mesh including well-formed quadrilateral elements and subsidiary triangular elements to an outline shape, based on a semi-regular distribution of internal points and their Delaunay triangulation. Methods for mapping the knotwork tiles to the flexible mesh are further provided.

The resulting characters are of reasonable artistic merit, defined by few parameters, and produced in a fraction of the time that it would take to derive similar characters by traditional techniques.

The usefulness of the mesh generation algorithm is not limited to knotwork decoration, and has a wide range of possible applications (including geometric tesselations, space-filling curves, Escher-like tilings).

Preferred Embodiment of Apparatus(s)

Figure 22:
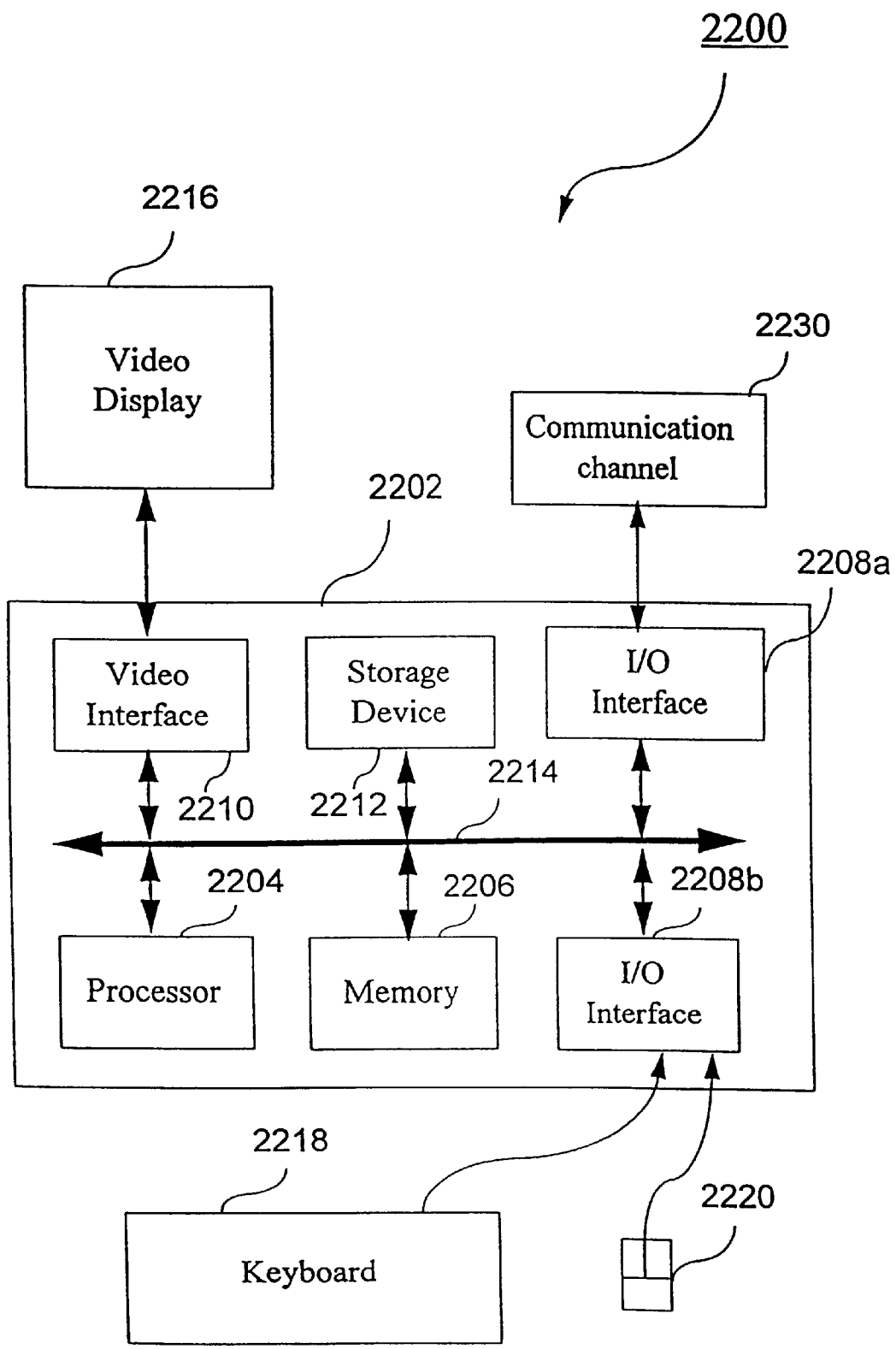
FIG. 22 is a block diagram of a general-purpose computer for implementing the preferred method.

The method of creating artistic effects in object outlines is preferably practiced using a conventional general-purpose computer, such as the one shown in FIG. 22 wherein the processes of FIGS. 1 to 21 may be implemented as software executing on the computer. In particular, the steps of methods of creating artistic effects in object outlines are effected by instructions in the software that are carried out by the computer. The software may be divided into two separate parts; one part for carrying out the creation processes; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for creating artistic effects in object outlines accordance with the embodiments of the invention.

The computer system 2200 consists of the computer 2202, a video display 2216, and input devices 2218, 2220. In addition, the computer system 2200 can have any of a number of other output devices including line printers, laser printers, plotters, and other reproduction devices connected to the computer 2202. The computer system 2200 can be connected to one or more other computers via a communication interface 2208a using an appropriate communication channel 2230 such as a modem communications path, a computer network, or the like. The computer network may include a local area network (LAN), a wide area network (WAN), an Intranet, and/or the Internet.

The computer 2202 itself consists of a central processing unit(s) (simply referred to as a processor hereinafter) 2204, a memory 2206 which may include random access memory (RAM) and read-only memory (ROM), input/output (IO) interfaces 2208a & 2208b, a video interface 2210, and one or more storage devices generally represented by a block 2212 in FIG. 22. The storage device(s) 2212 can consist of one or more of the following: a floppy disc, a hard disc drive, a magneto-optical disc drive, CD-ROM, magnetic tape or any other of a number of non-volatile storage devices well known to those skilled in the art. Each of the components 2204 to 2212 is typically connected to one or more of the other devices via a bus 2214 that in turn can consist of data, address, and control buses.

The video interface 2210 is connected to the video display 2216 and provides video signals from the computer 2202 for display on the video display 2216. User input to operate the computer 2202 can be provided by one or more input devices 2208b. For example, an operator can use the keyboard 2218 and/or a pointing device such as the mouse 2220 to provide input to the computer 2202.

The system 2200 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparestation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 2212 in FIG. 22) as the computer readable medium, and read and controlled using the processor 2204. Intermediate storage of the program and pixel data and any data fetched from the network may be accomplished using the semiconductor memory 2206, possibly in concert with the hard disk drive 2212.

In some instances, the program may be supplied to the user encoded on a CD-ROM or a floppy disk (both generally depicted by block 2212), or alternatively could be read by the user from the network via a modem device connected to the computer, for example. Still further, the software can also be loaded into the computer system 2200 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of creating artistic effects in an arbitrary object outline, the method comprising the steps of:
   generating a series of areas over an internal area of said outline, wherein the series of areas substantially follow the outline of the object and are substantially regular in size;
   warping one or more selected tile shapes of a predetermined set of tile shapes to cover corresponding said areas of said series; and
   storing said warped tile shapes into one or more records for graphical rendition,
   wherein said selected tile shapes are selected so that the selected warped tile shapes covering said areas of said series have patterns matching along their edges.

2. A method as claimed in claim 1, wherein said artistic effects comprise Celtic type knotwork designs.

3. A method as claimed in claim 1 or 2, wherein said object outline comprises a font character.

4. A method as claimed in claim 1 or 2, wherein said tile shapes comprise curves representing rope segments.

5. A method as claimed in claim 4, wherein said selecting and warping comprise substantially matching the position and thickness of rope segments along the edges of said tile shapes.

6. A method as claimed in claim 4, wherein said rope segments comprise multiple grouped substantially parallel rope segments.

7. A method as claimed in claim 1, wherein said generating step comprises:
   (a) creating a series of border points around said outline;
   (b) deriving from each of said border points a wave front comprising a series of internal points being a predetermined distance from a corresponding one of said border points and being internal to said border points within said outline;
   (c) combining said internal points where multiple internal points are within a predetermined distance;
   (d) utilising said internal points as a new wave front and iteratively applying steps (b) and (c) to said wave front points until said internal area is substantially covered by points being of similar distance from one another.

8. A method as claimed in claim 7, wherein each of said points comprises a normal vector and said internal points are created substantially along said normal vector and at substantially right angles to said normal vector.

9. A method as claimed in claim 7 or 8, wherein said predetermined distance is determined by a user setable parameter.

10. A method as claimed in claim 1, wherein said step of generating a series of areas comprises the substeps of:
    generating a mesh over the internal area of said outline; and
    forming a series of said areas from said mesh.

11. A method as claimed in claim 10, wherein said step of forming a series of areas from said mesh comprises performing a Delaunay triangulation of said mesh points.

12. A method as claimed in claim 10, wherein said step of generating a mesh over the internal area of said outline further comprises perturbing said mesh points.

13. A method as claimed in claim 11, wherein said step of forming a series of areas from said mesh further comprises forming a series of quadrilateral elements having substantially right angle corners and edges of similar lengths from said Delaunay triangulation in addition to a series of residual triangles.

14. A method as claimed in claim 4, further comprising the step of:
    applying an opacity map to said rope segments within said shapes.

15. A method as claimed in claim 14, wherein said opacity map comprises a blend towards the sides of said rope segments.

16. A method of creating artistic effects in an arbitrary object outline, the method comprising the steps of:
    providing a set of tiles in response to user input;
    generating a series of areas over an internal area of said outline, wherein the series of areas substantially follow the outline of the object and are substantially regular in size;
    selecting, for each said area, a tile from said tile set, wherein each said tile is selected so as to match selected tiles from adjacent areas;
    mapping, for each said area, a selected tile to said area so as to cover said area; and
    rendering the mapped tiles.

17. A method as claimed in claim 16, wherein said artistic effects comprise Celtic type knotwork designs.

18. A method as claimed in claim 16 or 17, wherein said object outline comprises a font character.

19. A method as claimed in claim 16 or 17, wherein said tiles comprise curves representing rope segments.

20. A method as claimed in claim 19, wherein said mapping of tiles comprises substantially matching the position and thickness of rope segments along the edges of said tile.

21. A method as claimed in claim 19, wherein said rope segments comprise multiple grouped substantially parallel rope segments.

22. A method as claimed in claim 16, wherein said step of generating a series of areas comprises the substeps of generating a mesh over the internal area of said outline; and forming a series of said areas from said mesh.

23. A method as claimed in claim 22, wherein said mesh generating substep comprises:
   (a) creating a series of borer points around said outline;
   (b) deriving from each of said border points a wave front comprising a series of internal points being a predetermined distance from a corresponding one of said border points and being internal to said border points within said outline;
   (c) combining said internal points where multiple internal points are within a predetermined distance;
   (d) utilising said internal points as a new wave front and iteratively applying steps (b) and (c) to said wave front points until said internal area is substantially covered by points being of similar distance from one another.

24. A method as claimed in claim 23, wherein each of said points comprises a normal vector and said internal points are created substantially along said normal vector and at substantially right angles to said normal vector.

25. A method as claimed in claim 21 or 24, wherein said predetermined distance is determined by a user setable parameter.

26. A method as claimed in claim 22, wherein said substep of forming a series of areas from said mesh comprises performing a Delaunay triangulation of said mesh points.

27. A method as claimed in claim 26, wherein said substep of forming a series of areas from said mesh further comprises forming a series of quadrilateral elements having substantially right angle corners and edges of similar lengths from said Delaunay triangulation in addition to a series of residual triangles.

28. A method as claimed in claim 22, wherein said substep of generating a mesh over the internal area of said outline further comprises perturbing said mesh points.

29. A method as claimed in claim 19, further comprising the step of:
   applying an opacity map to said rope segments within said tiles.

30. A method as claimed in claim 29, wherein said opacity map comprises a blend towards the sides of said rope segments.

31. An apparatus for creating artistic effects in an arbitrary object outline, the apparatus comprising:
   means for generating a series of areas over an internal area of said outline, wherein the series of areas substantially follow the outline of the object and are substantially regular in size;
   means for warping one or more selected tile shapes of a predetermined set of tile shapes to cover corresponding said areas of said series; and
   means for storing said warped tile shapes into one or more records for graphical rendition;
   wherein said selected tile shapes are selected so that the selected warped tile shapes covering said areas of said series have patterns matching along their edges.

32. An apparatus as claimed in claim 31, wherein said artistic effects comprise Celtic type knotwork designs.

33. An apparatus as claimed in claim 30 or 32, wherein said object outline comprises a font character.

34. An apparatus as claimed in claim 31 or 32, wherein said tile shapes comprise curves representing rope segments.

35. An apparatus as claimed in claim 34, wherein said means for warping and selecting acts to substantially match the position and thickness of rope segments along the edges of said tile shape.

36. An apparatus as claimed in claim 34, wherein said rope segments comprise multiple grouped substantially parallel rope segments.

37. An apparatus as claimed in claim 31, wherein said generating means comprises:
   means for creating a series of border points around said outline;
   means for deriving from each of said border points a wave front comprising a series of internal points being a predetermined distance from a corresponding one of said border points and being internal to said border points within said outline;
   means for combining said internal points where multiple internal points are within a predetermined distance; and
   means for utilising said internal points as a new wave front and iteratively performing the operations of said derivation and combination means to said wave front points until said internal area is substantially covered by points being of similar distance from one another.

38. An apparatus as claimed in claim 37, wherein each of said points comprises a normal vector and said internal points are created substantially along said normal vector and at substantially right angles to said normal vector.

39. An apparatus as claimed in claim 37 or 38, wherein said predetermined distance is determined by a user setable parameter.

40. Apparatus as claimed in claim 31, wherein said means for generating a series of areas comprises:
   means for generating a mesh over the internal area of said outline; and
   means for forming a series of said areas from said mesh.

41. An apparatus as claimed in claim 40, wherein said means for forming a series of areas from said mesh comprises means for performing a Delaunay triangulation of said mesh points.

42. An apparatus as claimed in claim 41, wherein said means for forming a series of areas from said mesh further comprises means for forming a series of quadrilateral elements having substantially right angle corners and edges of similar lengths from said Delaunay triangulation in addition to a series of residual triangles.

43. An apparatus as claimed in claim 40, wherein said means for generating a mesh over the internal area of said outline further comprises means for perturbing said mesh points.

44. An apparatus as claimed in claim 34, further comprising:
   means for applying an opacity map to said rope segments within said tile shapes.

45. An apparatus as claimed in claim 44, wherein said opacity map comprises a blend towards the sides of said rope segments.

46. An apparatus for creating artistic effects in an, arbitrary object outline, the apparatus comprising:
   means for providing a set of tiles in response to user input;
   means for generating a series of areas over an internal area of said outline, wherein the series of areas substantially follow the outline of the object and are substantially regular in size;

means for selecting, for each said area, a tile from said tile set, wherein each said tile is selected so as to match selected tiles from adjacent areas;

means for mapping, for each said area, a selected tile to said area so as to cover said area; and means for rendering the mapped lines.

47. An apparatus as claimed in claim 46, wherein said artistic effects comprise Celtic type knotwork designs.

48. An apparatus as claimed in claim 46 or 47, wherein said object outline comprises a font character.

49. An apparatus as claimed in claim 46 or 47, wherein said tiles comprise curves representing rope segments.

50. An apparatus as claimed in claim 49, wherein said mapping of tiles comprises substantially matching the position and thickness of rope segments along the edges of said tile.

51. An apparatus as claimed in claim 49, wherein said rope segments comprise multiple grouped substantially parallel rope segments.

52. An apparatus as claimed in claim 46, wherein said means for generating a series of areas comprises means for generating a mesh over the internal area of said outline; and means for forming a series of said areas from said mesh.

53. An apparatus as claimed in claim 52, wherein said means for generating said mesh comprises:

means for creating a series of border points around said outline;

means for deriving from each of said border points a wave front comprising a series of internal points being a predetermined distance from a corresponding one of said border points and being internal to said border points within said outline;

means for combining said internal points where multiple internal points are within a predetermined distance; and means for utilising said internal points as a new wave front and iteratively performing the operations of said derivation and combination means to said wave front points until said internal area is substantially covered by points being of similar distance from one another.

54. An apparatus as claimed in claim 53, wherein each of said points comprises a normal vector and said internal points are created substantially along said normal vector and at substantially right angles to said normal vector.

55. An apparatus as claimed in claim 53 or 54, wherein said predetermined distance is determined by a user setable parameter.

56. An apparatus as claimed in claim 50, wherein said means for forming a series of areas from said mesh comprises means for performing a Delaunay triangulation of said mesh points.

57. An apparatus as claimed in claim 56, wherein said means for forming a series of areas from said mesh further comprises means for forming a series of quadrilateral elements having substantially right angle corners and edges of similar lengths from said Delaunay triangulation in addition to a series of residual triangles.

58. An apparatus as claimed in claim 52, wherein said means for generating a mesh over the internal area of said outline further comprises means for perturbing said mesh points.

59. An apparatus as claimed in claim 49, further comprising:

means for applying an opacity map to said rope segments within said tiles.

60. An apparatus as claimed in claim 59, wherein said opacity map comprises a blend towards the sides of said rope segments.

61. A computer program product including a computer readable medium having recorded thereon a computer program for creating artistic effects in an arbitrary object outline, the computer program product comprising:

means for generating a series of areas over an internal area of said outline, wherein the series of areas substantially follow the outline of the object and are substantially regular in size;

means for warping one or more selected tile shapes of a predetermined set of tile shapes to cover corresponding said areas of said series; and means for storing said warped tile shapes into one or more records for graphical rendition;

wherein said selected tile shapes are selected so that the selected warped tile shapes covering said areas of said series have patterns matching along their edges.

62. A computer program product including a computer readable medium having recorded thereon a computer program for creating artistic effects in an arbitrary object outline, the computer program product comprising:

means for providing a set of tiles in response to user input;

means for generating a series of areas over an internal area of said outline, wherein the series of areas substantially follow the outline of the object and are substantially regular in size;

means for selecting, for each said area, a tile from said tile set, wherein each said tile is selected so as to match selected tiles from adjacent areas;

means for mapping, for each said area, a selected tile to said area so as to cover said area; and means for rendering the mapped tiles.

* * * * *

UNITED STATES PATENT AND TRADEMARK OFFICE
CERTIFICATE OF CORRECTION

PATENT NO. : 6,542,157 B1
DATED : April 1, 2003
INVENTOR(S) : Cameron Bolitho Browne It is certified that error appears in the above-identified patent and that said Letters Patent is hereby corrected as shown below:

Column 1,
Lines 6 and 10, "utilisation" should read -- utilization --;
Line 17, "italicised" should read -- italicized --; and
Line 20, "non" should read -- non- --.

Column 3,
Line 17, "utilisation" should read -- utilization --;
Lines 24, 29 and 48, "utilising" should read -- utilizing --;
Lines 32 and 46, "utilised" should read -- utilized --; and
Line 65, "realised" should read -- realized --.

Column 4,
Line 33, "initialised" should read -- initialized --; and
Line 54, "realisation" should read -- realization --.

Column 5,
Lines 37 and 38, "eg." should read -- e.g., --;
Line 45, "visualised" should read -- visualized --; and
Line 49, "synchronise" should read -- synchronize --.

Column 6,
Line 2, "$r_a$" should read -- $r_e$ --;
Line 3, "$r_f$" should read -- $r_i$ --;
Line 11, "$r_c \equiv r_i = 0.075$," should read -- $r_e\ r_i = 0.075$, --;
Line 11, "$r_f = 0.1275$," should read -- $r_i = 0.1275$, --;
Line 12, "$r_c = 0.175$," should read -- $r_e = 0.175$, --;
Line 14, "parameterised," should read -- parameterized, --; and
Line 25, "made" should read -- made to --.

Column 7,
Line 14, "initialised" should read -- initialized --.

UNITED STATES PATENT AND TRADEMARK OFFICE
CERTIFICATE OF CORRECTION

PATENT NO. : 6,542,157 B1
DATED : April 1, 2003
INVENTOR(S) : Cameron Bolitho Browne It is certified that error appears in the above-identified patent and that said Letters Patent is hereby corrected as shown below:

Column 8,
Line 5, "initialised" should read -- initialized --; and
Line 40, "summarised" should read -- summarized --.

Column 9,
Line 3, "quadlateral" should read -- quadrilateral --;
Line 3, "front" should read -- from --;
Line 4, "$T_1$" should read -- $T_i$ --;
Line 13, "is" (first occurrence) should read -- in --;
Line 17, "T;" should read -- $T_i$ --;
Line 42, "and" should read -- an --; and
Line 45, "the" should read -- The --.

Column 10,
Line 5, "exampled" should read -- example --; and
Line 65, "u', v',w'for" should read -- u', v', w' for --.

Column 11,
Line 60, "can" should read --can be--.

Column 12,
Line 2, "not" should read -- knot --; and
Line 38, "accordance" should read -- in accordance --.

Column 13,
Line 9, "Sparestation (TM)," should read -- Sparcstation (TM), --.

Column 14,
Line 15, "utilising" should read -- utilizing --.

Column 15,
Line 23, "utilising" should read -- utilizing --.

UNITED STATES PATENT AND TRADEMARK OFFICE
CERTIFICATE OF CORRECTION

PATENT NO. : 6,542,157 B1
DATED : April 1, 2003
INVENTOR(S) : Cameron Bolitho Browne It is certified that error appears in the above-identified patent and that said Letters Patent is hereby corrected as shown below:

Column 16,
Line 24, "utilising" should read -- utilizing --.

Column 17,
Line 38, "utilising" should read -- utilizing --.

Signed and Sealed this

Fourth Day of November, 2003

JAMES E. ROGAN
*Director of the United States Patent and Trademark Office*